(12) United States Patent
Hight

(10) Patent No.: US 6,266,917 B1
(45) Date of Patent: Jul. 31, 2001

(54) PEST CONTROL SYSTEM

(75) Inventor: Michael Hight, Chandler, AZ (US)

(73) Assignee: Atlantic Paste & Glue Co., Inc.

( * ) Notice: Subject to any disclaimer, the term of this patent is extended or adjusted under 35 U.S.C. 154(b) by 0 days.

(21) Appl. No.: 09/579,896

(22) Filed: May 26, 2000

(51) Int. Cl.⁷ .................................................. A01M 1/10
(52) U.S. Cl. ................................. 43/58; 43/81; 43/114; 43/131
(58) Field of Search ................................. 43/58, 81, 96, 43/107, 114, 121, 131; D22/119, 122; 47/66.6

(56) References Cited

U.S. PATENT DOCUMENTS

| | | | |
|---|---|---|---|
| D. 44,645 * | 9/1913 | Shikaku ............................... | D22/122 |
| D. 48,186 * | 11/1915 | Liska .................................. | D22/122 |
| D. 61,862 * | 1/1923 | Poleski et al. ...................... | D22/122 |
| 229,222 * | 6/1880 | Wood .................................. | 43/131 |
| 243,816 * | 7/1881 | Townsend ........................... | 43/131 |
| 251,222 * | 12/1881 | Hamilton ............................. | 43/131 |
| 598,521 * | 2/1898 | Karr .................................... | 43/121 |
| 619,754 * | 2/1899 | Hunter et al. ....................... | 43/82 |
| 820,341 * | 5/1906 | Bedford .............................. | 43/131 |
| 1,186,178 * | 6/1916 | French ................................ | 43/131 |
| 1,759,359 * | 5/1930 | Lennox ............................... | 43/131 |
| 2,187,276 * | 1/1940 | Miller .................................. | 43/131 |
| 2,637,931 * | 5/1953 | Sklar ................................... | 43/83 |
| 3,224,145 * | 12/1965 | Ballard ................................ | 43/131 |
| 3,992,803 * | 11/1976 | Kaiser ................................. | 43/83 |
| 4,208,829 * | 6/1980 | Manning ............................. | 43/131 |
| 4,226,042 * | 10/1980 | Gilbert ................................ | 43/96 |
| 4,400,905 * | 8/1983 | Brown ................................. | 43/121 |
| 4,438,584 * | 3/1984 | Baker et al. ......................... | 43/58 |
| 4,493,161 * | 1/1985 | Soloway et al. .................... | 43/107 |
| 4,660,320 * | 4/1987 | Baker et al. ......................... | 43/131 |
| 5,038,516 * | 8/1991 | Doucette ............................. | 43/131 |
| 5,040,327 * | 8/1991 | Stack et al. ......................... | 43/131 |
| 5,148,624 * | 9/1992 | Schmidt .............................. | 43/81 |
| 5,193,302 * | 3/1993 | Rusco et al. ........................ | 43/107 |
| 5,272,832 * | 12/1993 | Marshall et al. .................... | 43/131 |
| 5,383,301 * | 1/1995 | Babb ................................... | 43/114 |
| 5,505,018 * | 4/1996 | Parker ................................. | 43/131 |
| 5,651,211 * | 7/1997 | Regan et al. ........................ | 43/114 |
| 5,657,575 * | 8/1997 | Miller et al. ......................... | 43/131 |
| 5,806,237 * | 9/1998 | Nelson et al. ....................... | 43/131 |
| 5,930,944 * | 8/1999 | Knuppel .............................. | 43/114 |
| 5,943,817 * | 8/1999 | Miller .................................. | 43/131 |
| 5,950,355 * | 9/1999 | Gilbert ................................ | 43/114 |
| 5,987,811 * | 11/1999 | Wiesener et al. ................... | 43/131 |
| 6,138,402 * | 10/2000 | Wotton ................................ | 43/107 |
| 6,145,242 * | 11/2000 | Simpson ............................. | 43/131 |

FOREIGN PATENT DOCUMENTS

555429 * 8/1943 (GB) ........................................ 43/81

* cited by examiner

*Primary Examiner*—Darren W. Ark
(74) *Attorney, Agent, or Firm*—Bernard Malina; Malina & Wolson

(57) ABSTRACT

A pest control article is provided which includes a pest control device such as a poisoned bait or trap and a decorative housing. The housing includes a decorative unit and a pedestal supporting the decorative unit. A compartment within the pedestal is provisioned with the poisoned bait or trap allowing the pest control device to be out of public view. Rodents or insects enter the compartment through one or more apertures within the pedestal so as to access a trap or poisoned bait.

8 Claims, 2 Drawing Sheets

PEST CONTROL SYSTEM

BACKGROUND OF THE INVENTION

1. Field of the Invention

The invention concerns a method and pest control article for capturing or eliminating rodents and insects in an aesthetically, unobtrusive manner.

2. The Related Art

Insects and rodents are uninvited intruders within our homes and businesses. Pest control is a major industry. Poisoned bait and traps are primary weapons in pest control. Unfortunately, these weapons must often be deployed in areas visible to others. Homeowners would prefer not to advertise that they have a pest control problem. Neighbors might conclude that the infested household is subject to poor housekeeping or other domestic sanitary failure.

Commercial establishments are even more seriously concerned with the problem. Customers must not be given the impression of unsanitary conditions. This is particularly so with hotels, restaurants, and all stores with edible merchandise. Traps left in the open on such premises are aesthetically displeasing; they leave a negative impression of the establishment in the minds of the public.

Rodent control has a long history. U.S. Pat. No. 619,754 (Hunter et al.) discloses a mouse trap based upon a guillotine principle. A choker-wire is housed within the body of a corn cob. Presumably, at least some portion of the trapped mouse is held within the corn cob body out of visible sight.

U.S. Pat. No. 2,637,931 (Sklar) discloses an animal trap based on a trigger-operated release mechanism allowing a spring-loaded jaw to close over the trapped animal body. A simulated cat's head will overlie at least a portion of a mouse so unfortunate as to encounter the spring-loaded jaw.

U.S. Pat. No. 3,992,803 (Kaiser) describes a miniature house opened at one end with a trap mechanism mounted on an inner wall. The arrangement is intended to allow disposal of the trapped dead animal without personal contact.

In all the foregoing described devices, the body of the caught rodent, at least in part, may not be visible publicly. Nonetheless, the traps themselves are in open view. They signal that the premises may have an infestation. A method is necessary to avoid the public embarrassment and negative press associated with traps in open view.

Accordingly, it is an object of the present invention to provide a method and article which can control pests while still being out of view from anyone other than the pest control engineers.

Another object of the present invention is to provide a method and article of pest control which can be used in conjunction with immovable synthetic landscape.

SUMMARY OF THE INVENTION

A pest control article is provided which includes:

a pest control device selected from the group consisting of a poisoned bait, a trap and combinations thereof;

a decorative housing comprising a decorative and a pedestal supporting the decorative unit, the pedestal including a compartment with at least one opening to an exterior, the pest control device being positioned within the compartment so as to be out of public view.

Pests within the meaning of the present invention include, without limitation, rodents and insects. Most particularly, the invention seeks to control mice and rat populations. Traps suitable for rodents include spring-loaded devices, bait stations and glue filled trays. The latter may be of the type reported in U.S. Pat. No. 4,438,584 (Baker et al.) wherein a non-porous plastic tray with a central indentation contains a layer of pressure sensitive adhesive. Any vermin coming in contact with the adhesive will be unable to free themselves from the tacky pressure sensitive adhesive.

The decorative unit may be a plant, a sculpture, a bench, or any type of furniture. Most preferred for purposes of this invention is that the decorative unit be a plant. When the decorative unit is a plant, the decorative housing may include a pot or planter filled with soil.

A further feature of the invention is that the decorative housing advantageously include a fastener for securing the housing against unauthorized movement from a selected location. Non-limiting examples of fasteners include adhesive liquid nails (suitable for attachment to concrete), bolts, cables or chains.

A coupling mechanism may further be provided on the pest control article. The coupling allows for joining of the decorative unit and pedestal in a reversibly lockable manner. Only authorized personnel will be able to access the compartment housing the pest control device. Security of the coupling ensures that non-authorized persons, such as children, will not access any poisonous bait or chemicals in the compartment housing the trap and bait control stations. Thus, all unauthorized persons will be unable to access the compartment thereby avoiding injury from the traps.

Furthermore, a method for pest control is provided which includes:

providing a decorative housing including a decorative unit and a pedestal supporting the decorative unit, the pedestal having a compartment with at least one opening to an exterior;

placing in the compartment a pest control device so as to be out of public view, the pest control device selected from the group consisting of a poisoned bait, a trap and combinations thereof;

removing or replenishing the pest control device to eliminate trapped pests or to supply more bait.

BRIEF DESCRIPTION OF THE DRAWING

Further objects, advantages and features of the present invention will become readily apparent from consideration of the drawing in which.

DETAILED DESCRIPTION

Many business establishments, especially those catering to the public, are, for obvious reasons, reluctant to place rodent traps in lobbies, building exteriors, or other locations where they are viewable by the public. Now a system has been developed which provides for effective rodent and insect control without having control devices in open view. Traps and poisoned bait is placed in pest accessible compartments of a pedestal supporting a landscape decoration.

Figure 1:
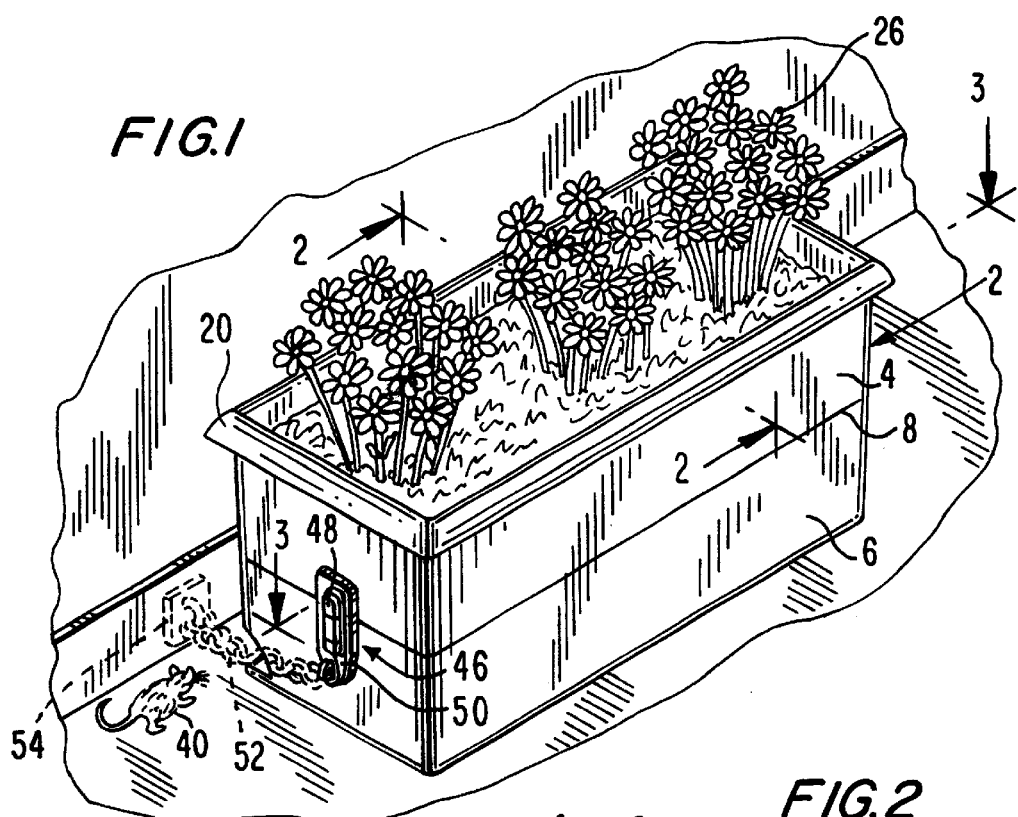
FIG. 1 is a plan perspective view of a preferred embodiment illustrating a bed of flowers within a planter mounted on a pedestal containing a rodent trap and bait station.
Figure 2:
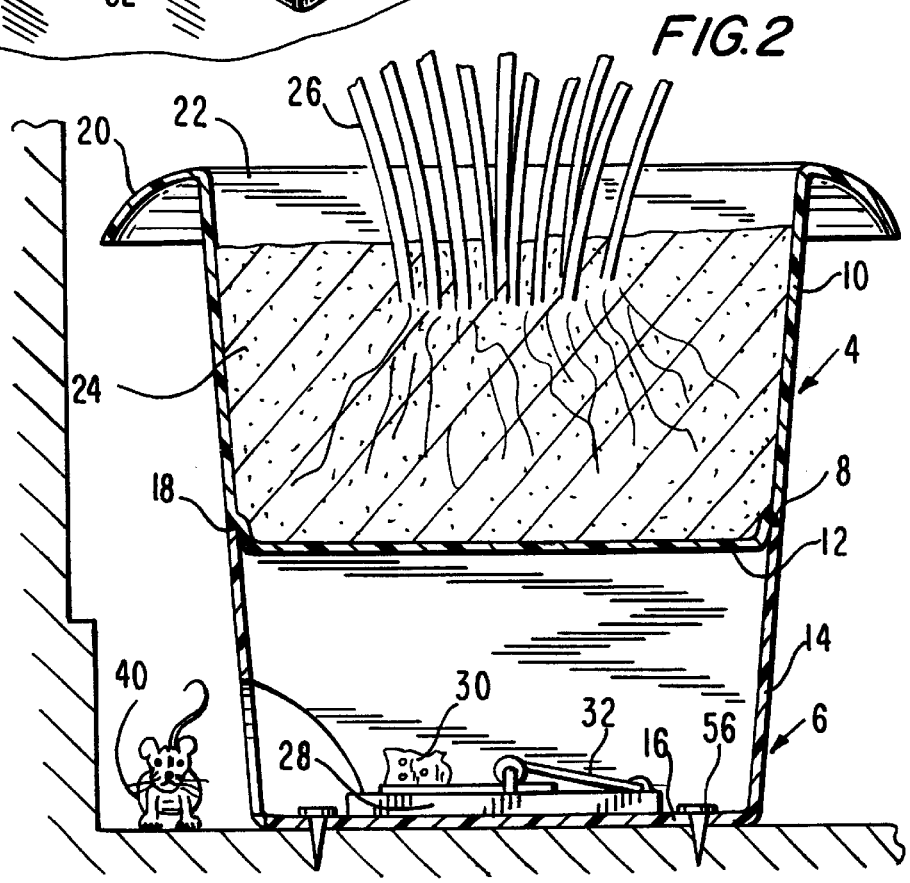
FIG. 2 is a cross-sectional view along line 2—2 of FIG. 1.

FIG. 1 illustrates the pest control article having a decorative housing 2 which includes a decorative unit 4 functioning as a planter and a pedestal 6 serving as a false bottom to the article. Decorative unit 4, as shown in FIG. 2, possesses a seating flange 8 along a lower edge of walls 10 and just above a floor 12 of the decorative unit. Side walls 14 defining the pedestal taper slightly outwards from a bottom wall 16 of the pedestal. Upper edges 18 of the side walls 14 are aligned to allow nesting of the seating flange 8 thereby supporting the decorative unit above the pedestal. A rim 20 borders an open mouth 22 of the decorative unit. Not only does rim 20 enhance aesthetics but serves as a gripping surface for lifting the decorative unit from atop the pedestal to allow access to the latter.

Figure 4:
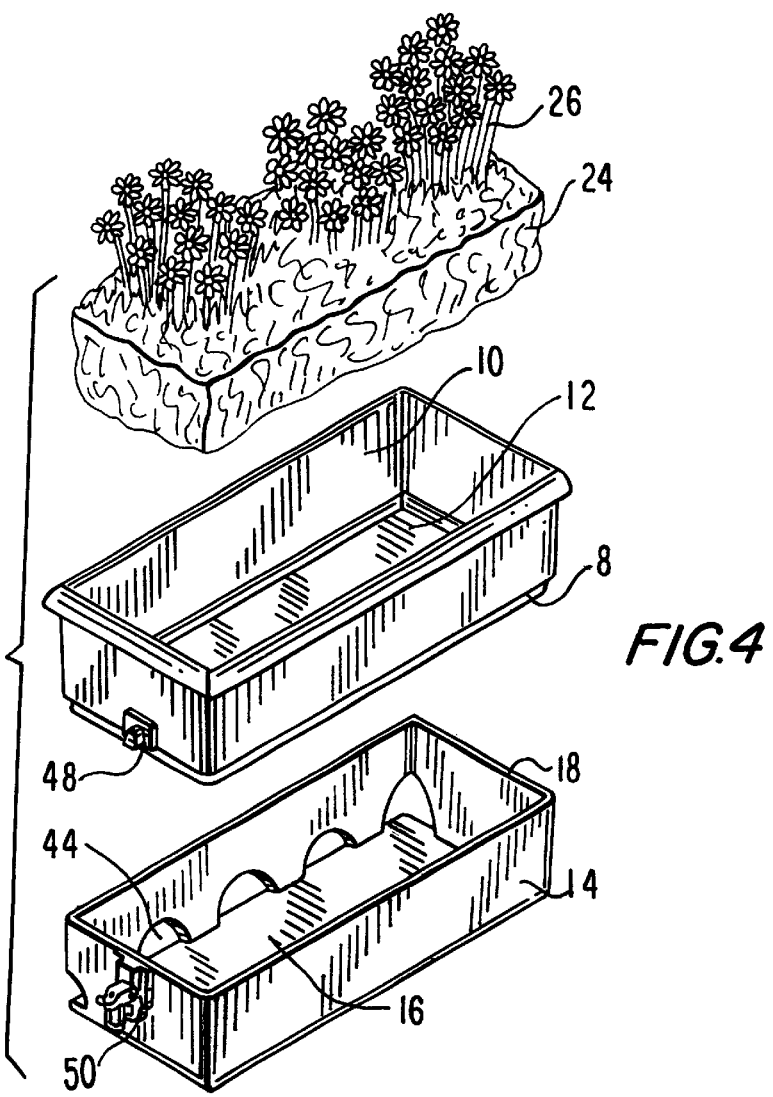
FIG. 4 is an exploded view of the pest control article as shown in FIG. 1.

As shown in FIGS. 2 and 4, the decorative unit contains soil 24 allowing plants 26 to grow therein.

Figure 3:
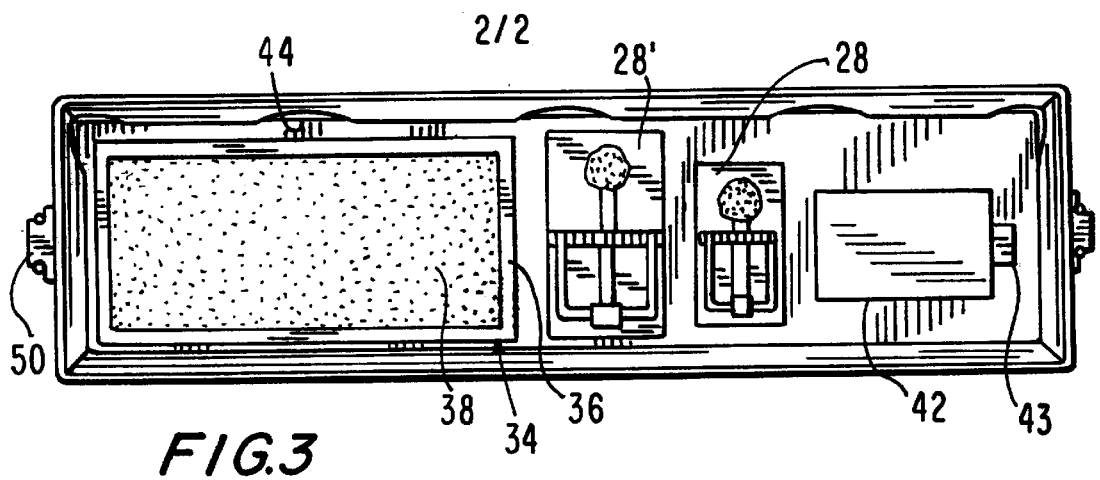
FIG. 3 is a cross-sectional view along line 3—3 of FIG. 1.

FIGS. 2 and 3 illustrate various pest control devices housed within the pedestal compartment. These devices may include mousetraps 28 of the type which operate with a lure 30 positioned in the path of a spring action trapping arm 32. The bottom wall area of the pedestal compartment is of sufficient size to accommodate both smaller and larger mousetraps 28, 28'. FIG. 3 also illustrates a glue filled trap 34 which may be used as an alternative or in conjunction with the spring action type mousetraps 28, 28'. Trap 34 is formed of a tray 36 and a glue 38 sufficient to adhesively restrain a mouse. A still further pest control device is illustrated in the form of a poisoned bait station 42 with a releasable lock 43 in which an edible substance laced with a poison such as Warfarin® is placed within a plastic bag or other housing having an opening available for the pest to achieve access to the poisoned bait. The bait station is not limited to rodents but may contain poison directed at the elimination of insects including cockroaches, waterbugs, ants, and other crawling creatures.

A series of apertures 44 are formed in sidewalls 14 of the pedestal compartment. These apertures allow pests to enter the pedestal compartment and be engaged by the pest control devices.

Unauthorized access to the pest control devices is hindered by a fastener 46 in the form of a locking post 48 attached to the landscape compartment wall 10 and aligned latch 50 secured to pedestal compartment sidewall 14. Latch 50 swingably moves upward to engage locking post 48 in a locking position. A securing chain 52 is available to connect the decorative housing to a building wall 54 thereby preventing unauthorized removal. Another method of preventing removal is through use of bolts 56 which attach a bottom wall 16 of the pedestal compartment to an exterior ground surface.

Additional advantages and modifications will readily occur to one skilled in the art. Therefore, the invention in its broader aspects is not limited to the specific details and representative configurations shown and described herein. Accordingly, various modifications may be made without departing from the spirit and scope of the general inventive concept as defined by the appended claims and their equivalents.

What is claimed is:

1. A pest control article comprising:

a pest control device for rodent control selected from the group consisting of a poisoned bait, a trap, and combinations thereof;

a decorative housing comprising a decorative unit positioned over a pedestal supporting the decorative unit, the pedestal including a compartment with at least one opening to an exterior, the decorative unit being a planter compartment receiving a plant, the pest control device being positioned within the compartment so as to be out of public view.

2. The article according to claim 1 wherein the trap is a spring-loaded device or a glue filled tray.

3. The article according to claim 1 wherein the decorative unit has an open mouth bordered by a rim to serve as a gripping surface for lifting the decorative unit from atop the pedestal to allow access to the pest control device.

4. The article according to claim 3 wherein the planter compartment is filled with soil.

5. The article according to claim 1 wherein the decorative housing further comprises a connector securing the housing against unauthorized movement from a present location to a distant location.

6. The article according to claim 5 wherein the connector is selected from the group consisting of a securing chain, bolt, cable and adhesive substance.

7. The article according to claim 1 further comprising a fastener for joining the decorative unit and pedestal, the fastener being unlockable only by authorized personnel.

8. A method for pest control of rodents comprising:

providing a decorative housing comprising a decorative unit positioned over a pedestal supporting the decorative unit, the pedestal comprising a compartment with at least one opening to an exterior, the decorative unit being a planter compartment receiving a plant;

placing within the compartment a pest control device for use against rodents so as to be out of public view, the pest control device selected from the group consisting of a poisoned bait, a trap and combinations thereof;

removing or replenishing the pest control device to eliminate trapped rodents or to supply more of said bait.

* * * * *